United States Patent [19]

Kaminski

[11] Patent Number: 5,032,344
[45] Date of Patent: * Jul. 16, 1991

[54] METHOD FOR APPLYING LABELS IN THE MOLDS OF A PLASTIC BLOW MOLDING MACHINE

[75] Inventor: Ronald S. Kaminski, Bowling Green, Ohio

[73] Assignee: Owens-Illinois Plastic Products Inc., Toledo, Ohio

[ * ] Notice: The portion of the term of this patent subsequent to Aug. 29, 2006 has been disclaimed.

[21] Appl. No.: 417,369

[22] Filed: Oct. 5, 1989

[51] Int. Cl.⁵ .............................................. B29C 49/24
[52] U.S. Cl. ..................... 264/509; 425/503; 425/126.1; 156/521; 156/571
[58] Field of Search ................ 264/509, 511; 425/503, 425/504, 126.1; 156/521, 571

[56] References Cited

U.S. PATENT DOCUMENTS

| | | | |
|---|---|---|---|
| 4,355,967 | 10/1982 | Hellmer | 425/504 |
| 4,737,099 | 4/1988 | Kaminski | 264/509 |
| 4,795,597 | 1/1989 | Whiteley et al. | 264/509 |
| 4,824,630 | 4/1989 | Mohney | 264/509 |
| 4,853,169 | 8/1989 | Kaminski | 264/509 |
| 4,861,541 | 8/1989 | Kaminski et al. | 264/509 |

Primary Examiner—Jan H. Silbaugh
Assistant Examiner—Catherine Timm

[57] ABSTRACT

In the method of making hollow plastic articles in which a label is positioned in each of a plurality of spaced partible molds in a predetermined array, preforms are positioned in each set of partible molds and the molds are closed and the preforms are blown outwardly to the confines of the molds to apply the labels to the resultant hollow plastic articles. The method and apparatus for delivering labels to the molds includes providing labels on a roll of labels, successively die cutting the labels from the web of the roll directly onto awaiting vacuum pads, thereafter moving each label and delivering each label to an endless vacuum conveyor by moving the label without substantially changing the orientation of the plane of the label relative to the plane of the label when it is cut and relative to the endless conveyor, indexing the endless vacuum conveyor to provide an array of labels on the conveyor which corresponds in spacing to the spacing of the array of molds, engaging the array of labels on the conveyor and removing the array of the labels from the conveyor and depositing the array of labels into the array of molds.

3 Claims, 9 Drawing Sheets

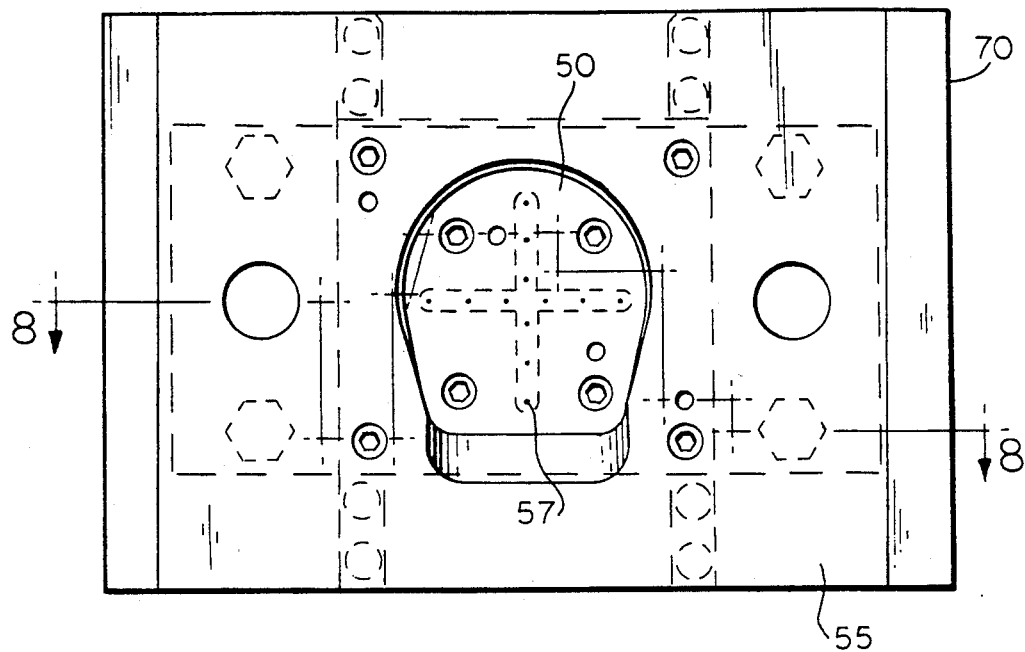
FIG. 7
FIG. 8
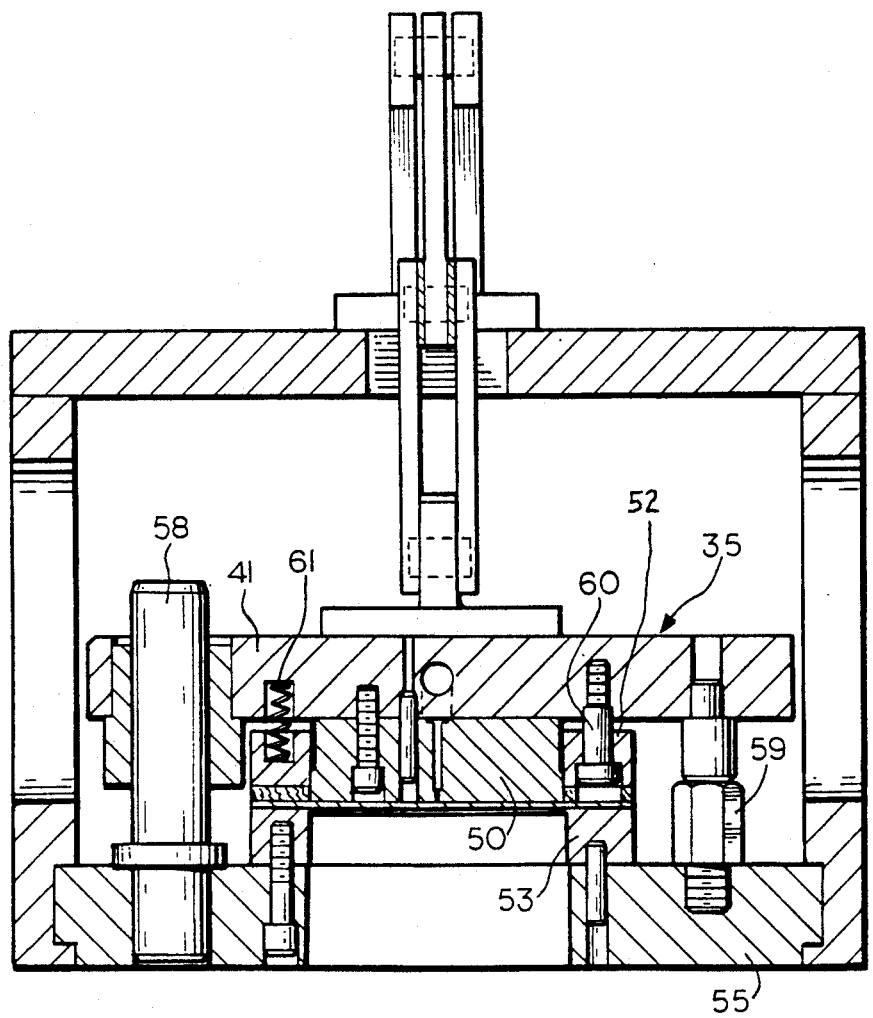

METHOD FOR APPLYING LABELS IN THE MOLDS OF A PLASTIC BLOW MOLDING MACHINE

This invention relates to the application of labels to hollow blown articles.

BACKGROUND AND SUMMARY OF THE INVENTION

In the making of hollow blown plastic articles such as containers, it has heretofore been suggested that labels be held in one or more of the mold sections by vacuum so that when the parison is blown outwardly into conformity with the cavity, the label becomes adhered or bonded to the article.

The molds are often provided in a plurality of sets of partible molds in a predetermined array and, in order to delivery the labels, a plurality of magazines are provided, one for each mold half, and an associated plurality of pick-up and delivery devices are provided to function to remove labels from the magazines and deliver them to one or both of the mold halves of each set.

As set forth in U.S. Pat. No. 4,636,166, having a common assignee with the present application, an apparatus is provided wherein labels are successively removed from a label magazine and positioned in an array which corresponds in spacing to the spacing of the sets of molds. The labels are then simultaneously moved in the array from the first position to a second position within the open partible molds and deposited in the molds. The apparatus comprises a magazine for supporting labels in a stack and an endless belt transfer device positioned adjacent the magazine. The belt is indexed in predetermined spaces corresponding to the spaces of the array of molds. A label pick-up device removes a label from the magazine and deposits it on the conveyor so that the spacing between the labels on the endless transfer conveyor corresponds to the spacing between the sets of molds. Another label deposit device removes the labels simultaneously from the endless transfer conveyor and delivers them between the open partible molds.

Where labels are to be cut from a roll of labels, problems arise because the free end of labels tends to move so that when a label is cut from the roll, the cut may not be square. These conditions are aggravated when the labels are made of plastic or plastic laminated film.

In U.S. Pat. No. 4,680,000, there is disclosed a method and apparatus for applying labels in the molds of a plastic blow molding machine of the type wherein a plurality of sets of molds are mounted on a wheel rotatable about a horizontal axis and the molds are moved toward and away from one another to enclose a parison and the parison is then blown to the confines of the cavity between the mold sections. In this patent, the method of delivery comprises removing labels successively from one or more magazines, depositing the labels on an endless conveyor which transports the labels to a position adjacent an open mold and laterally transferring the labels from the conveyor to a position within the molds such that when a mold closes about a plastic parison and the parison is blown, the labels become adhered to the blown plastic bottle.

The use of magazines inherently produces problems. Among these are the cost of magazines, the need to replenish the supply of labels in the magazines and the space required about the container forming machine. In addition, when plastic or foam labels are being handled, they are difficult to stack and handle for placement in the magazines. If the labels are cut from a web and stacked it is difficult to ascertain whether they are in proper registry. If the shape of the plastic or foam label is complex, the magazines are more complex. After being formed, the plastic or foam labels must be handled in batches or stacked and are not easily handled.

In co-pending application Ser. No. 063,463 filed June 22, 1987, now U.S. Pat. No. 4,853,169 there is disclosed a method comprising providing labels on a roll of labels, successively die cutting the labels from the web of the roll and simultaneously delivering each label directly to an endless vacuum conveyor, indexing the endless vacuum conveyor to provide an array of labels on the conveyor which corresponds in spacing to the spacing of the array of molds, engaging the array of labels on the conveyor and removing them from the conveyor and depositing the array of labels in the array of molds.

Among the objectives of the present invention are to provide a method and apparatus which results in more accurate placement of the labels on a vacuum transfer conveyor; which permits more careful control of the accuracy of the configuration of the labels; which permits labels of various configurations to be used; and wherein the orientation of the labels with respect to the vacuum transfer conveyor is greatly facilitated; and wherein the apparatus for receiving labels and delivering them to a conveyor functions efficiently and accurately such that it may be utilized with either die cut labels or labels removed from a magazine.

In accordance with the invention, the method and apparatus provides for each label to be die cut directly onto vacuum pads which are in position for receiving the labels after which the vacuum pads are moved without substantially changing the orientation of the labels directly onto a vacuum transfer conveyor which is thereafter indexed to form an array of labels for delivery in an array to the molds.

DESCRIPTION OF THE DRAWINGS

FIG. 7 is an end view of a portion of the apparatus shown in FIG. 6.

FIG. 8 is a sectional view taken along the line 8—8 in FIG. 7.

DESCRIPTION

Figure 1:
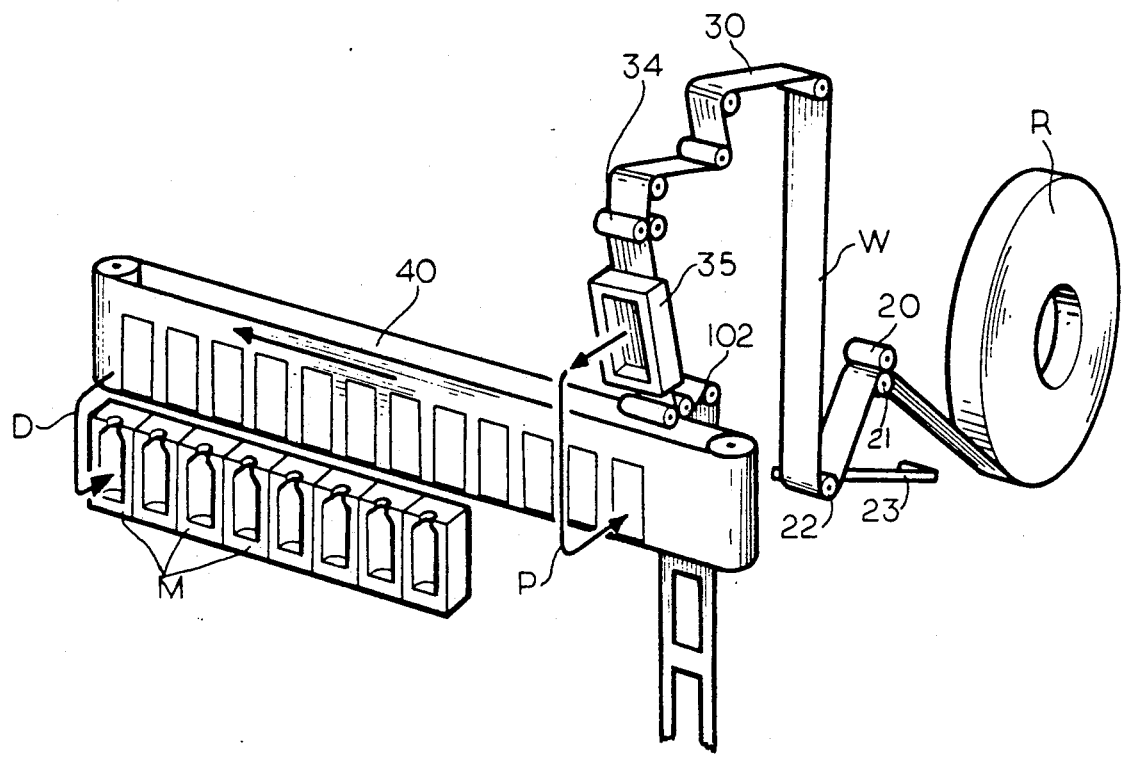
FIG. 1 is a schematic fragmentary perspective view of an apparatus embodying the invention.
Figure 3:
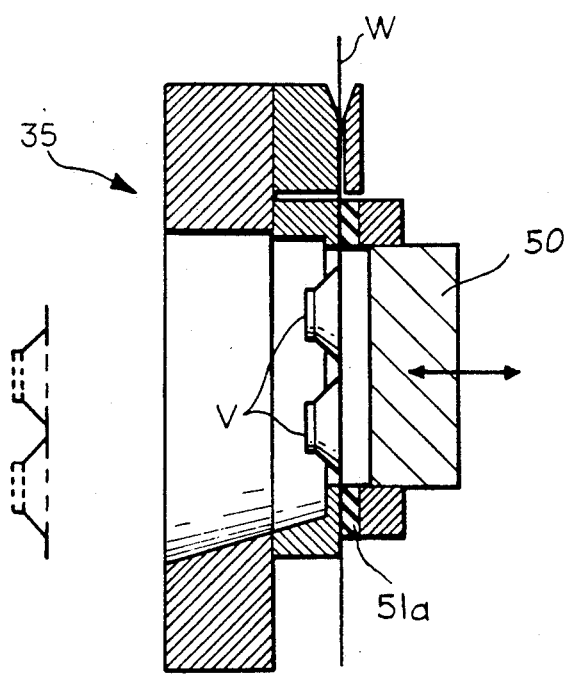
FIG. 3 is a sectional schematic view of a portion of the apparatus.
Figure 2:
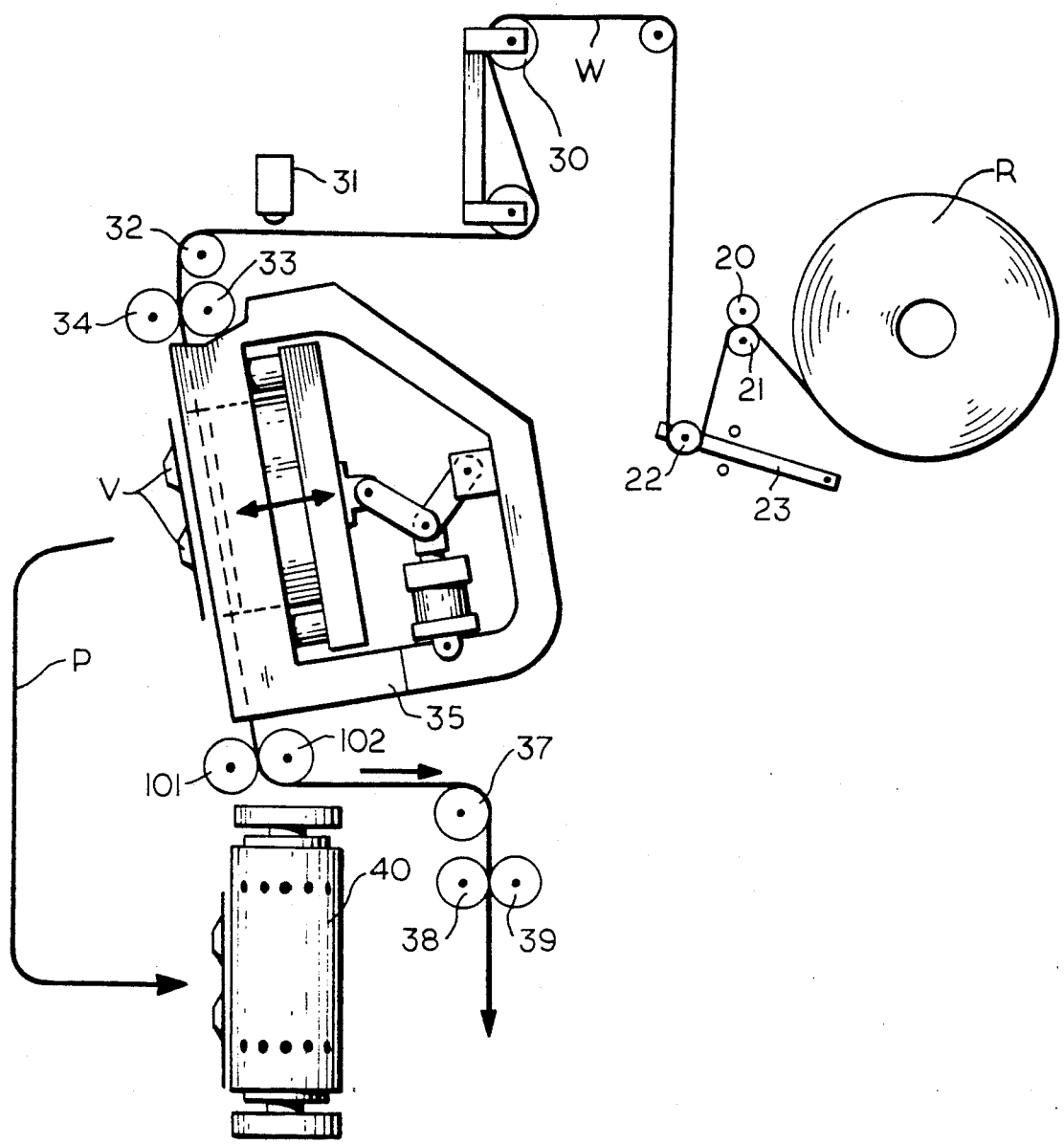
FIG. 2 is a partly schematic elevational view of the apparatus embodying the invention.

Referring to FIGS. 1-3, the invention relates to blow molded plastic articles such as containers wherein labels are applied to sections of a set of molds and the mold sections are closed about heated parisons or preforms and the preforms are blown outwardly into conformity with the mold sections causing the labels to be adhered or bonded to the blown article. The method and apparatus have particular utility when utilized with a blow molding apparatus wherein the apparatus includes an extruder associated with each cavity of the molds and a head which is moved downwardly to receive one end of the extruded tube in a neck mold in the head and is then moved to draw the tube upwardly to position a preform between the mold sections. The mold sections are then closed and the article blown to the desired configuration within the confines of the mold. In such an apparatus, the head supports label delivery devices as hereinafter described which deliver labels to the cavities of the molds.

As shown schematically in FIGS. 1 and 2, a web W is fed by drive rolls 20, 21 under a dancer arm roller 22, on a dancer arm 23 through a web guide device 30, past a label sensor 31 over an idler roller 32 and then between drive rollers 33, 34 past a punch die cut mechanism 35, which directs labels successively from the web W. The remainder of the web then passes between drive rollers 101, 102 and over idler roller 37 between drive rollers 38, 39 such that the portion of the web between the drive rollers 33, 34 and 101, 102 is taut and under tension.

As each label is sensed by the sensor 31, the die mechanism 35 is operated to die cut a label of particular configuration directly onto vacuum cups V which are in position adjacent the die punch. Each label is then delivered by the vacuum cups V to an endless vacuum conveyor 40 in the path P and deposited on the endless conveyor 40. During this movement, the label is moved without substantially changing its orientation relative to the plane of the label when it is cut and relative to the endless conveyor 40. The endless conveyor 40 is successively indexed so that an array of labels is provided on the conveyor corresponding in spacing to an array of mold M in the mold. A label delivery mechanism D simultaneously removes the array of labels from the conveyor 40 and delivers them simultaneously to the cavities of the molds M. As shown in FIG. 3, in accordance with the invention, the die mechanism 35 cuts the label from the web W onto the vacuum cups V which are already in position such that any tendency to misalign or move the labels is minimized.

Referring to FIGS. 4–8, the die cut mechanism 35 includes punch 41 mounted on a clevis block 42 and connected by a clevis rod 43 and link 44 to the shaft 45 of a cylinder 46 that has one end fixed to a frame 47. Link 44 is pivoted to the frame as at 48. The punch 41 includes a punch die 50 (FIG. 6) mounted thereon. The punch die 50 is surrounded by a stripper plate 51 and cooperates with a trim die 52 that is surrounded by a web guide 53. The web guide 53 cooperates with a web guide plate 54 on the frame to guide the web W in its movement past the punch die 50. The die mechanism 35 further includes a die plate 55 on which the web guide 53 and trim die 52 are mounted. Provision is made for supplying air and vacuum to the surface of the punch die 50 through a passageway 56 in punch 41 and a plurality of communicating openings and orifices 57 in the punch die 50 that extend to the surface of the punch die 50. As shown in FIG. 8, the punch 41 is guided by guide posts 58, against a stop 59 and the stripper 51 is mounted on the punch 41 for limited axial movement by a shaft 60 and yieldingly urged away from the punch 41 by one or more springs 61. A resilient pad 51a is interposed between stripper plate 51 trim die 52.

Figure 9:
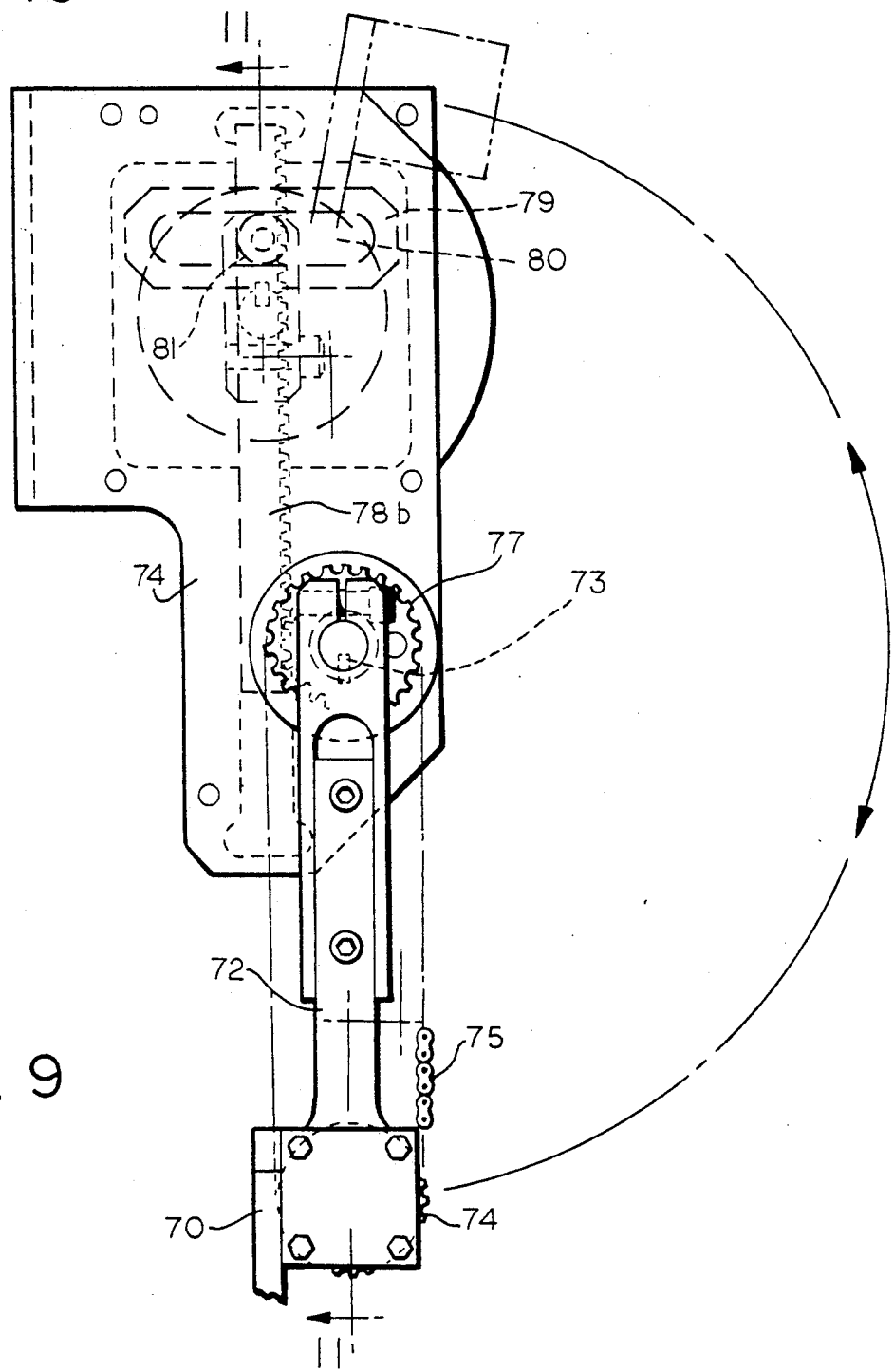
FIG. 9 is a fragmentary side elevational view of another portion of the apparatus.
Figure 11:
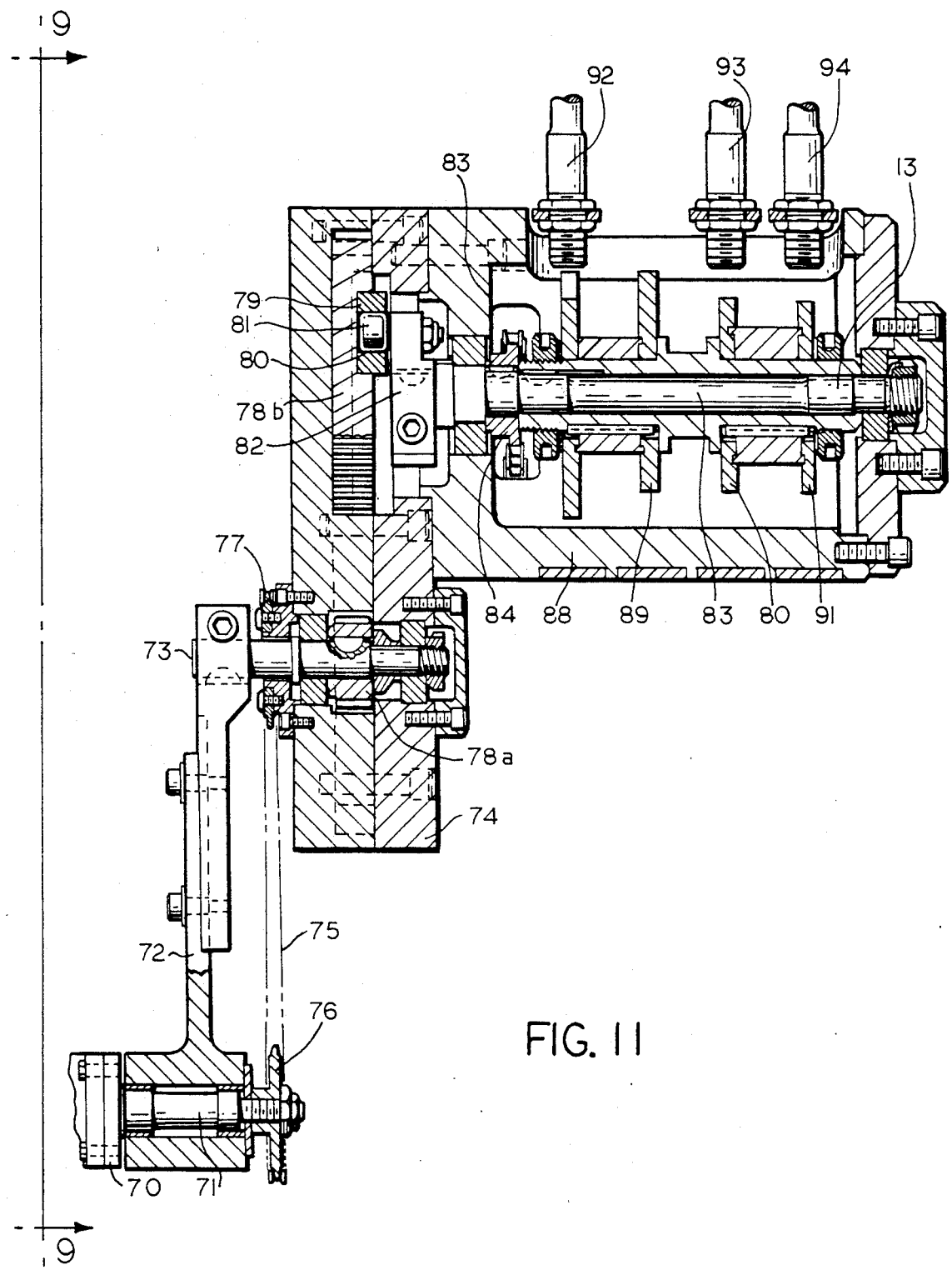
FIG. 11 is a fragmentary sectional view taken along the line 11—11 in FIG. 9.
Figure 12:
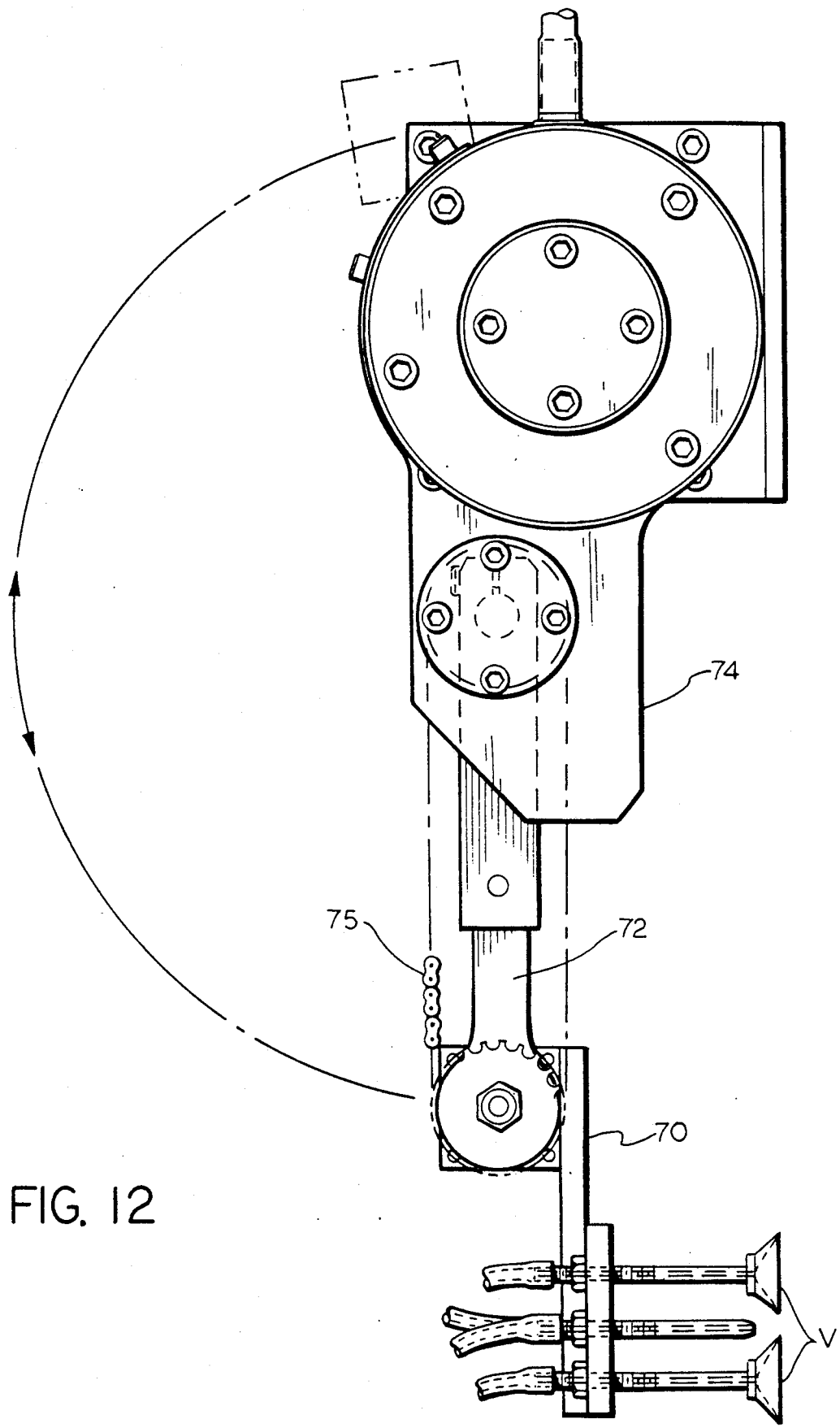
FIG. 12 is a fragmentary view taken generally along the line 12—12 in FIG. 11.

Referring to FIGS. 4, 5, 9 and 12, the vacuum cups V are supported for movement on the frame by a mechanism which functions to maintain the plane of each label in substantially the same plane as the label as it faces the endless conveyor 40 as when the label faces the punch. This mechanism provides for the vacuum cups V to move from a position adjacent the die mechanism 35 to a position adjacent the conveyor 40 by a swinging movement during which there is rotation so that the plane of the vacuum cups V remains substantially the same. Such a mechanism includes an arm 70 that extends substantially vertically at all times (FIGS. 5, 12) and is mounted by a shaft 71 on an oscillating arm 72 (FIG. 12). The arm 72 is in turn mounted on a shaft 73 in a housing 74. An endless chain 75 is trained over sprocket 76 on shaft 71 and sprocket 77 on shaft 73 (FIGS. 9, 12). A pinion 78a on shaft 73 (FIG. 11) meshes with a rack 78b which is mounted in the housing 74 for reciprocating movement so that as the rack 78b is reciprocated, the shaft 73 is rotated to oscillate the arm 72. During this movement, the rotation of the shaft 73 causes the shaft 71 to rotate maintaining the arm 70, on which the vacuum cups V are mounted, in substantially the same orientation in space in order that the labels will be also so maintained.

The rack 78b is reciprocated by an arrangement which includes a bracket 79 having an elongated slot 80 therein into which a cam follower 81 extends (FIGS. 9 and 11). The cam follower 81 is mounted on a bracket 82 fixed to a shaft 83 so that rotation of the shaft will move the cam follower 81 in an orbit and thereby reciprocate the rack 78b.

Figure 5:
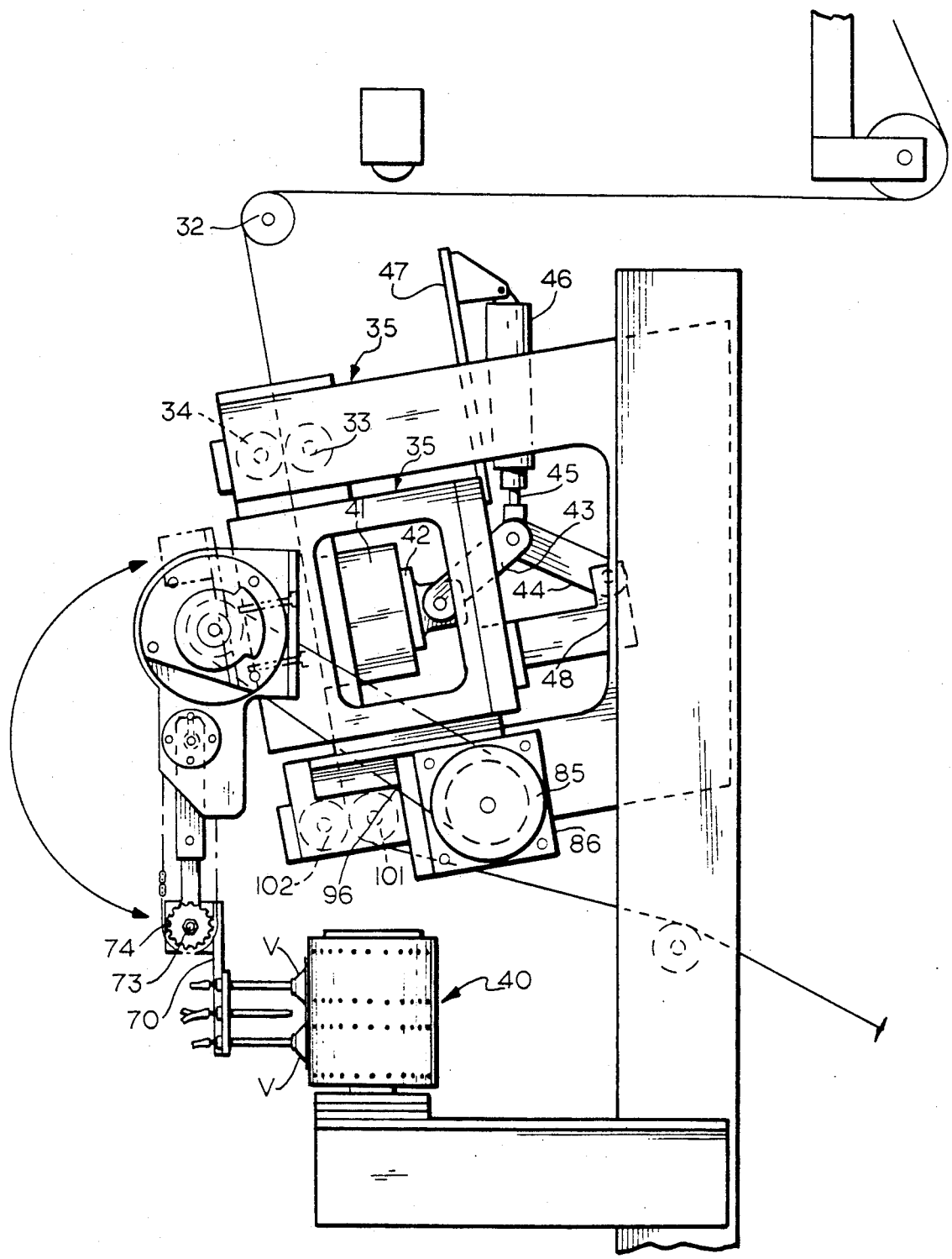
FIG. 5 is an elevational view of a portion of the apparatus shown in FIG. 4.
Figure 6:
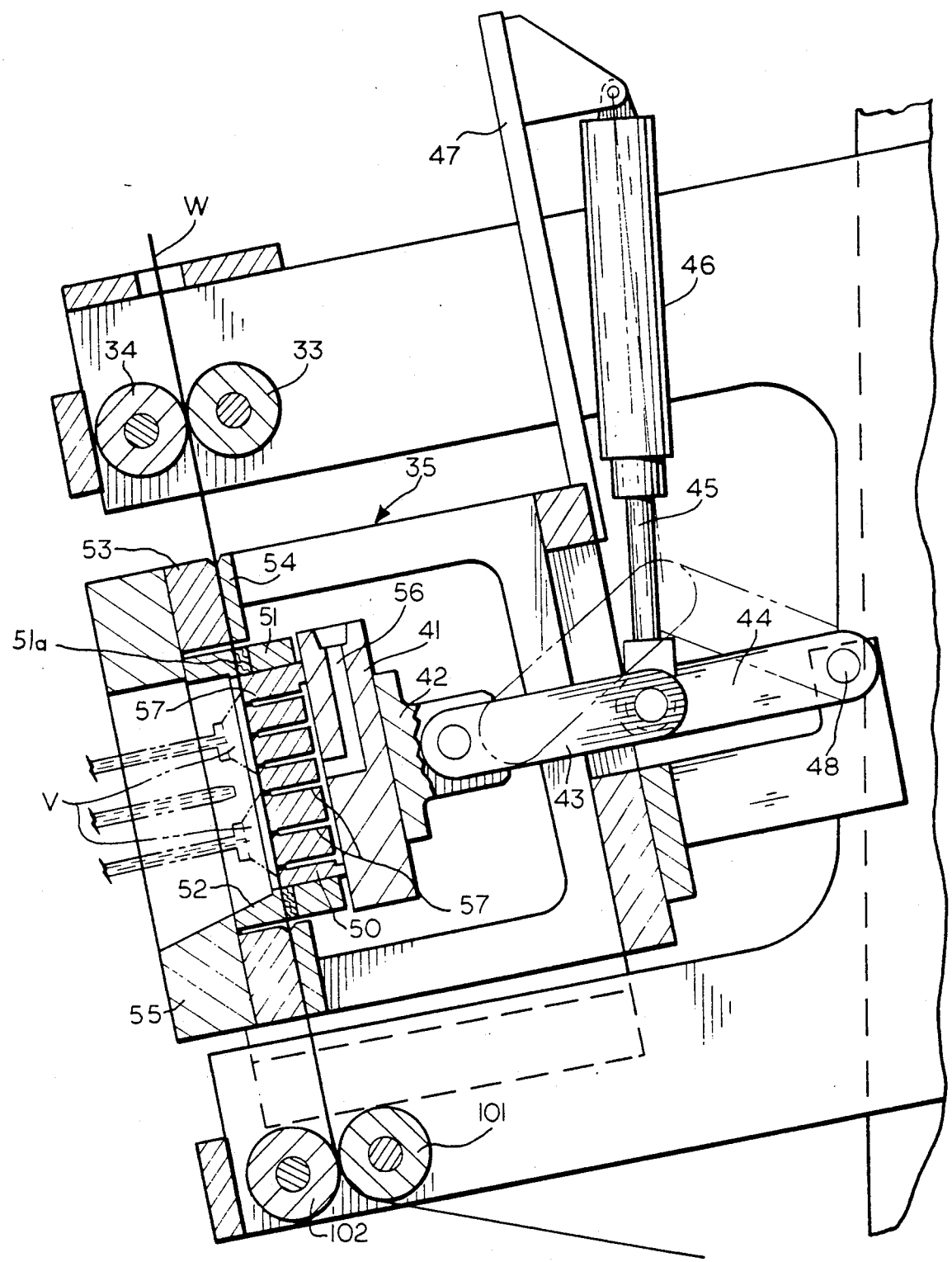
FIG. 6 is a fragmentary sectional view taken along the line 6—6 in FIG. 4.
Figure 10:
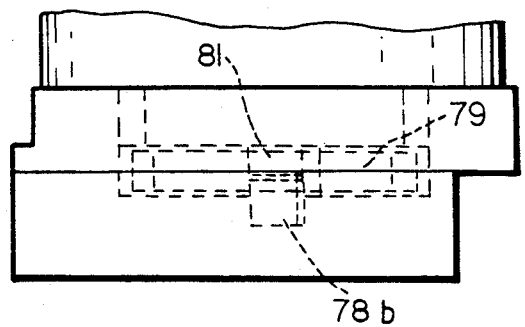
FIG. 10 is a fragmentary plan view of a portion of the apparatus shown in FIG. 9.

Drive for the shaft 83 is achieved through a chain that engages a sprocket 84 on the shaft 83 and is trained over a sprocket 85 driven by a motor 86 (FIG. 5).

Shaft 83 also supports a series of cams 88, 90 and 91 which function to actuate proximity switches 92, 93 and 94 for controlling respectively vacuum, indexing and reset functions. The configuration of the cams is such that the desired function of these switches is achieved. A cam 89 is provided at a position to which proximity switch can be moved when a double index is desired, as where the number of cavities and distance between the cavities changes.

Figure 4:
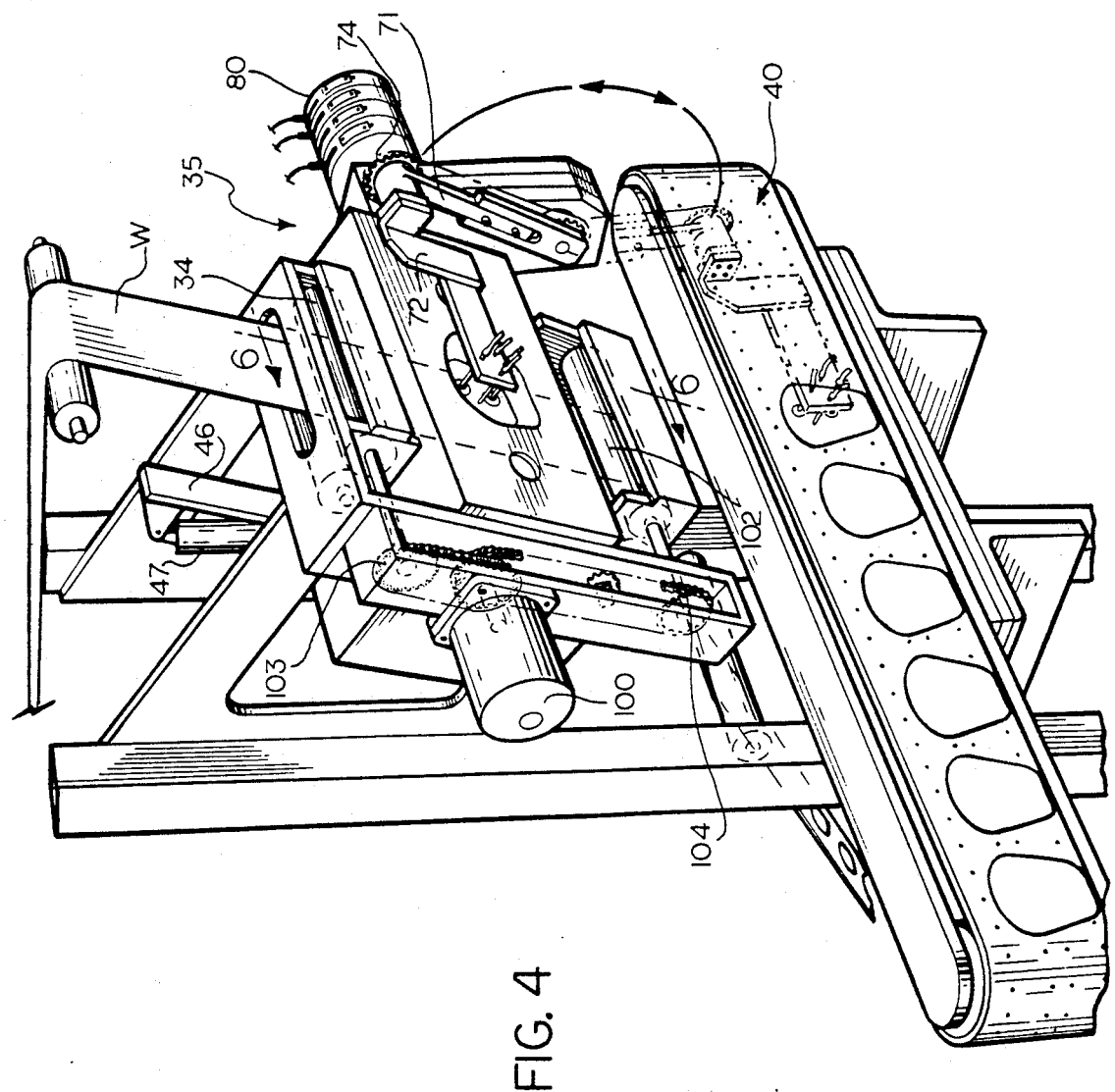
FIG. 4 is a fragmentary perspective view of a portion of the apparatus.

Referring to FIG. 4, the apparatus further includes a drive motor 100 that functions to drive the rollers 33, 34 and 101, 102 upstream and downstream of the die mechanism 35 through associated chains and sprockets 103, 104.

In operation, the drive rolls 33, 34 and 101, 102 intermittently drive the web W of labels past the die mechanism 35. The timing of the positioning of the vacuum cups V is such that prior to the punching of the label, the vacuum cups V are positioned and stationary so that the punch 50 cuts the label from the web and delivers it directly onto the vacuum cups V. The arm 71 is then swung downwardly so that the labels are delivered to the conveyor 40. Air and vacuum valves are actuated by the proximity switches to function to maintain the vacuum during the transfer and release the vacuum so that the labels will be delivered to the intermittently driven conveyor 40. The conveyor 40 includes an endless belt and associated vacuum chambers so that the labels will be retained on the conveyor 40. It has been found that preferably the labels L should be positioned adjacent the lower edge of the conveyor as a measuring point or bench mark for the label position.

It can be seen that the construction of the mechanism for swinging the vacuum cups V is such that the mechanism is continuously driven. However, due to the construction including the slot 80 and cam follower 81, the arm pauses in its position and is stationary adjacent the die punch mechanism and is also stationary adjacent the endless conveyor.

It can thus be seen that there has been provided a method and apparatus which results in more accurate placement of the labels on a vacuum transfer conveyor; which permits more careful control of the accuracy of the configuration of the labels; which permits labels of various configurations to be used; and wherein the orientation of the labels with respect to the vacuum transfer conveyor is greatly facilitated; and wherein the apparatus for receiving labels and delivering them to a conveyor functions sufficiently and accurately such that it may be utilized with either die cut labels or labels removed from a magazine.

I claim:

1. In a method for applying labels to plastic articles wherein a label is positioned in each of a plurality of spaced partible molds in a predetermined array, a perform is positioned in each set of partible molds and the molds are closed and the preforms blown outwardly to the confines of the mold to apply the label to the resultant hollow plastic article, the improvement which comprises moving a web label material past a die punch station including a die punch mechanism, positioning vacuum devices adjacent said die punch mechanism at said die punch station, thereafter die punching labels successively from said web by manipulating said die punch mechanism and causing said die punch mechanism to deliver them directly to the vacuum devices which are momentarily stationary adjacent the die punch mechanism, and interrupting the movement of an endless vacuum conveyor so that is it stationary, moving the vacuum devices to deliver the labels while maintaining the orientation of the labels substantially in the same plane successively to the stationary endless conveyor, controlling movement of the vacuum devices such that the vacuum devices with the labels therein are momentarily stationary adjacent the stationary vacuum conveyor, the steps of positioning vacuum devices adjacent the die punch mechanism and moving the vacuum devices to deliver the labels to the endless conveyor being performed in a continuous manner with the vacuum devices being substantially momentarily stationary at both the position adjacent the die punch mechanism and the position adjacent the endless conveyor.

2. The method set forth in claim 1 wherein said movement of said vacuum devices is in a reciprocating arcuate path.

3. The method set forth in any one of claims 1 or 2 including the step of continuously tensioning a portion of the web adjacent said die punch mechanism by gripping the portion with pinch rollers upstream and downstream of the die punch mechanism during the step of die punching.

* * * * *